United States Patent
Ozeki

(10) Patent No.: US 6,416,404 B2
(45) Date of Patent: Jul. 9, 2002

(54) AIR CONDITIONER UNIT

(75) Inventor: Yukio Ozeki, Tochigi (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 09/912,430

(22) Filed: Jul. 26, 2001

(30) Foreign Application Priority Data

Jul. 26, 2000 (JP) ........................................ 2000-225887

(51) Int. Cl.$^7$ ................................................ B60H 3/00
(52) U.S. Cl. .................. 454/156; 454/69; 454/121; 137/601.01
(58) Field of Search ......................... 454/121, 69, 156; 137/601.01, 601.08

(56) References Cited

U.S. PATENT DOCUMENTS

| | | | | |
|---|---|---|---|---|
| 3,589,206 A | * | 6/1971 | Herbon | 454/121 |
| 3,683,784 A | * | 8/1972 | Matsui et al. | 237/12.3 A |
| 4,741,477 A | * | 5/1988 | Ito | 237/12.3 A |
| 5,245,886 A | * | 9/1993 | Truesdell et al. | 74/107 |
| 5,281,049 A | * | 1/1994 | Holt | 137/863 |
| 5,338,249 A | * | 8/1994 | Hildebrand et al. | 454/121 |
| 5,699,851 A | * | 12/1997 | Saida et al. | 165/42 |
| 5,779,535 A | * | 7/1998 | Bendell et al. | 137/637.3 |
| 5,921,527 A | * | 7/1999 | Ikawa et al. | 251/129.03 |
| 5,924,332 A | * | 7/1999 | Ozeki | 454/316 |
| 6,009,934 A | * | 1/2000 | Sunaga et al. | 165/42 |
| 6,083,099 A | * | 7/2000 | Brown | 165/43 |
| 6,254,474 B1 | * | 7/2001 | Davidsson | 237/12.3 A |

FOREIGN PATENT DOCUMENTS

JP    9-20128    1/1997

* cited by examiner

Primary Examiner—Harold Joyce
Assistant Examiner—Derek S. Boles
(74) Attorney, Agent, or Firm—Foley & Lardner

(57) ABSTRACT

An air conditioner unit comprises a case having a plurality of air passages defined therein; two pivotal mode doors pivotally arranged in the case to provide various operation modes of the air conditioner unit when assuming given angular positions, each of the mode doors having a pivot shaft of which leading end is exposed to the outside from a wall of the case; and a mode door actuating mechanism attached to an outer surface of the wall of the case to actuate the two pivotal mode doors. The mode door actuating mechanism comprises a base structure adapted to be mounted to the outer surface of the wall; two operation levers pivotally held at respective hub portions thereof by the base structure, each operation lever having a cam opening and being coaxially connected to the leading end of the pivot shaft of corresponding one of the two mode doors; a slider member slidably held on the base structure; two engaging pins provided on the slider member and slidably engaged with the cam openings of the two operation levers respectively; and an actuator member for sliding the slider member relative to the base structure.

15 Claims, 11 Drawing Sheets

(VENTILATION MODE)

(VENTILATION MODE)

(BI-LEVEL MODE)

(BI-LEVEL MODE)

(HEAT MODE)

(HEAT MODE)

(DEFROSTER-FOOT MODE)

(DEFROSTER-FOOT MODE)

(DEFROSTER MODE)

(DEFROSTER MODE)

AIR CONDITIONER UNIT

BACKGROUND OF THE INVENTION

1. Field of the Invention

The present invention relates in general to air conditioner units, and more particularly to the air conditioner units for a motor vehicle.

2. Description of Related Art

In order to clarify the task of the present invention, one known air conditioner unit for a motor vehicle will be described with reference to FIG. 12 of the accompanying drawings, which is shown in Japanese Patent First Provisional Publication 9-20128.

The known air conditioner unit "a" comprises a case "b" in which many air passages are defined. The case "b" has a ventilation air blow opening "c", a defroster air blow opening "d" and a foot air blow opening "e" from which conditioned air is discharged to the outside of the case "b".

A first mode door "f" is arranged at the ventilation air blow opening "c" for adjusting the rate of air blown outward from the opening "c". That is, the first mode door "f" is pivoted between a close position to close the ventilation air blow opening "c" while opening the air passage directed to the defroster air blow opening "d" and the foot air blow opening "e", and an open position to open the ventilation air blow opening "c" while closing the air passage directed to the defroster air blow opening "d" and the foot air blow opening "e".

In the air passage directed to the defroster air blow opening "d" and the foot air blow opening "e", there is arranged a second mode door "g" which can adjust both the rate of air blown outward from the defroster air blow opening "d" and the rate of air blown outward from the foot air blow opening "e". That is, this second mode door "g" is pivoted between a foot position to open the foot air blow opening "e" while closing the defroster air blow opening "d" and a defroster position to open the defroster air blow opening "d" while closing the foot air blow opening "e".

In the unit case "b", there is arranged a mode door actuating mechanism "h" which actuates the first and second mode doors "f" and "g" to their desired positions under a given mode. That is, the mode door actuating mechanism "h" comprises a first actuating lever "h1" fixed to a pivot shaft of the first mode door "f", and a second actuating lever "h2" fixed to a pivot shaft of the second mode door "g". The mechanism "h" further comprises a rotatable main link "h4" which is engageable with the first actuating lever "h1" and engageable with the second actuating lever "h2" through an intermediate link "h3". Although not shown in the drawing, the mechanism "h" further comprises a drive cable which pulls the main link "h4" to a desired position under a given mode.

The intermediate link "h3" is pivotally connected to the unit case "b" and comprises two arm portions which extend radially outward from its pivoted center portion. One of the arm portions has at its leading end a pin "j" slidably engaged with a cam slot "i" formed in the second actuating lever "h2", and the other arm portion is formed with a cam slot "k". The intermediate link "h3" functions to turn the second mode door "g" in a direction opposite to the direction of the first mode door "f".

The main link "h4" comprises three, viz., first, second and third arm portions which extend radially outward from its pivoted center portion. The first arm portion has at its leading end a pin "n" slidably engaged with a cam slot "m" formed in the first actuating lever "h1", the second arm portion has at its leading end a pin "p" slidably engaged with a cam slot "k" formed in the intermediate link "h3", and the third arm portion has at its leading end a connecting opening "q" to which the drive cable (not shown) is connected.

In the air conditioner unit "a" having the above-mentioned construction, for achieving a ventilation mode of the unit "a", the main link "h4" is pivoted to a given position by the drive cable, so that the first mode door "f" opens the ventilation air blow opening "c" while closing the air passage directed to the defroster air blow opening "d" and foot air blow opening "e". While, for achieving a defroster mode of the unit "a", the first mode door "f" is pivoted to open the air passage directed to the defroster air blow opening "d" and foot air blow opening "e" while closing the ventilation air blow opening "c" and the second mode door "g" is pivoted to open the defroster air blow opening "d" while closing the foot air blow opening "e". While, for achieving a foot mode of the unit "a", the first mode door "f" opens the air passage directed to the defroster air blow opening "d" and foot air blow opening "e" while closing the ventilation air blow opening "c", and the second mode door "g" opens the foot air blow opening "e" while closing the defroster air blow opening "d".

SUMMARY OF THE INVENTION

In the above-mentioned known air conditioner unit "a", the mode door actuating mechanism "h" includes the rotatable main link "h4" and the intermediate link "h3" which are relatively large in size. Due to usage of such larger parts, the layout of the three openings "c", "d" and "e" and the two mode doors "f" and "g" is highly limited, which causes a difficulty with which the air conditioner unit "a" is made compact in size.

It is therefore an object of the present invention to provide an air conditioner unit which can be compact in size due to usage of a compact mode door actuating mechanism.

According to a first aspect of the present invention, there is provided an air conditioner unit which comprises a casing having a plurality of air passages defined therein; pivotal mode doors pivotally arranged in the case to provide given operation modes of the air conditioner unit when assuming given angular positions, each mode door having a pivot shaft of which leading end is exposed to the outside of a wall of the case; and a mode door actuating mechanism arranged on the wall of the case to actuate the pivotal mode doors, the mode door actuating mechanism comprising operation levers which are pivotal relative to the wall of the case, each operation lever having a cam opening and being connected to the exposed leading end of the pivot shaft of the corresponding mode door to pivot therewith; a slider member which is slidable relative to the wall of the case; engaging pins provided on the slider member and slidably engaged with the cam openings of the operation levers respectively; and an actuator member for sliding the slider member relative to the wall of the case.

According to a second aspect of the present invention, there is provided an air conditioner unit which comprises a case having a plurality of air passages defined therein; at least two pivotal mode doors pivotally arranged in the case to provide various operation modes of the air conditioner unit when assuming given angular positions, each of the mode doors having a pivot shaft of which leading end is exposed to the outside from a wall of the case; and a mode door actuating mechanism attached to an outer surface of the wall of the case to actuate the two pivotal mode doors, the mode door actuating mechanism comprising a base structure adapted to be mounted to the outer surface of the wall; two operation levers pivotally held at respective hub portions thereof by the base structure, each operation lever having a cam opening and being coaxially connected to the leading end of the pivot shaft of corresponding one of the two mode doors; a slider member slidably held on the base structure; two engaging pins provided on the slider member and slidably engaged with the cam openings of the two operation levers respectively; and an actuator member for sliding the slider member relative to the base structure.

According to a second aspect of the present invention, there is provided an air conditioner unit which comprises a case having a plurality of air passages defined therein; two pivotal mode doors pivotally arranged in the case to provide various operation modes of the air conditioner unit when assuming given angular positions, each of the mode doors having a pivot shaft of which leading end is exposed to the outside from a wall of the case; and a mode door actuating mechanism detachably attached to an outer surface of the wall of the case to actuate the two pivotal mode doors, the mode door actuating mechanism comprising an elongate housing detachably mounted to the outer surface of the wall, the housing having first and second holding portions at upper and lower walls thereof; first and second operation levers pivotally held at respective hub portions thereby by the first and second holding portions respectively, each operation lever having a generally L-shaped cam opening and being coaxially connected to the leading end of the pivot shaft of corresponding one of the two mode doors; a slider member slidably held in the housing; two engaging pins provided by the slider member and slidably engaged with the L-shaped cam openings of the first and second operation levers respectively; an elongate lid member attached to the housing; and an actuator member for sliding the slider member in the housing.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

For ease of understanding, various directional terms such as right, left, upper, lower, rightward, etc., are used in the description. However, such terms are to be understood with respect to only a drawing or drawings on which the corresponding part or parts are illustrated.

Figure 1:
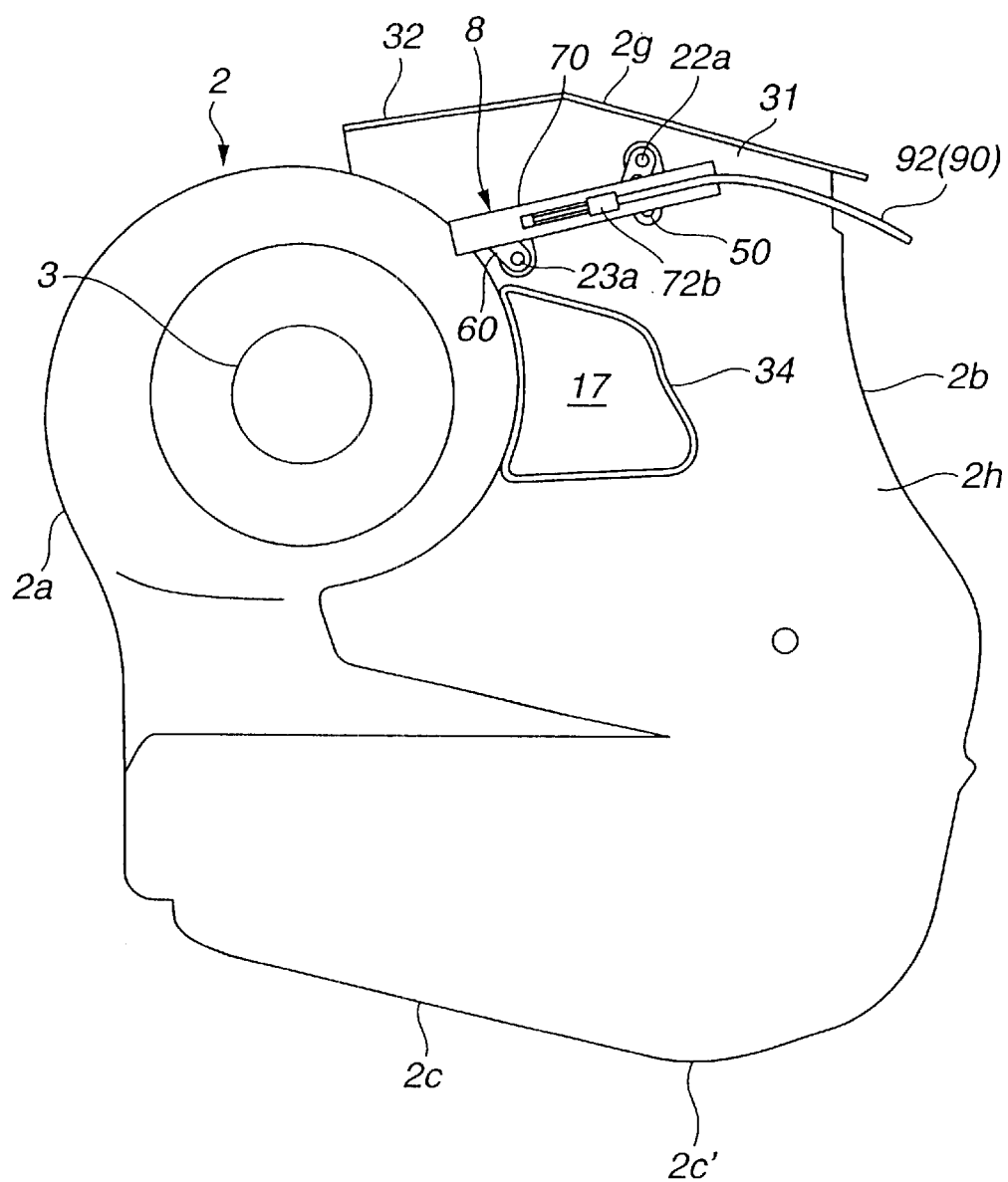
FIG. 1 is a side view of an air conditioner unit according to the present invention.
Figure 2:
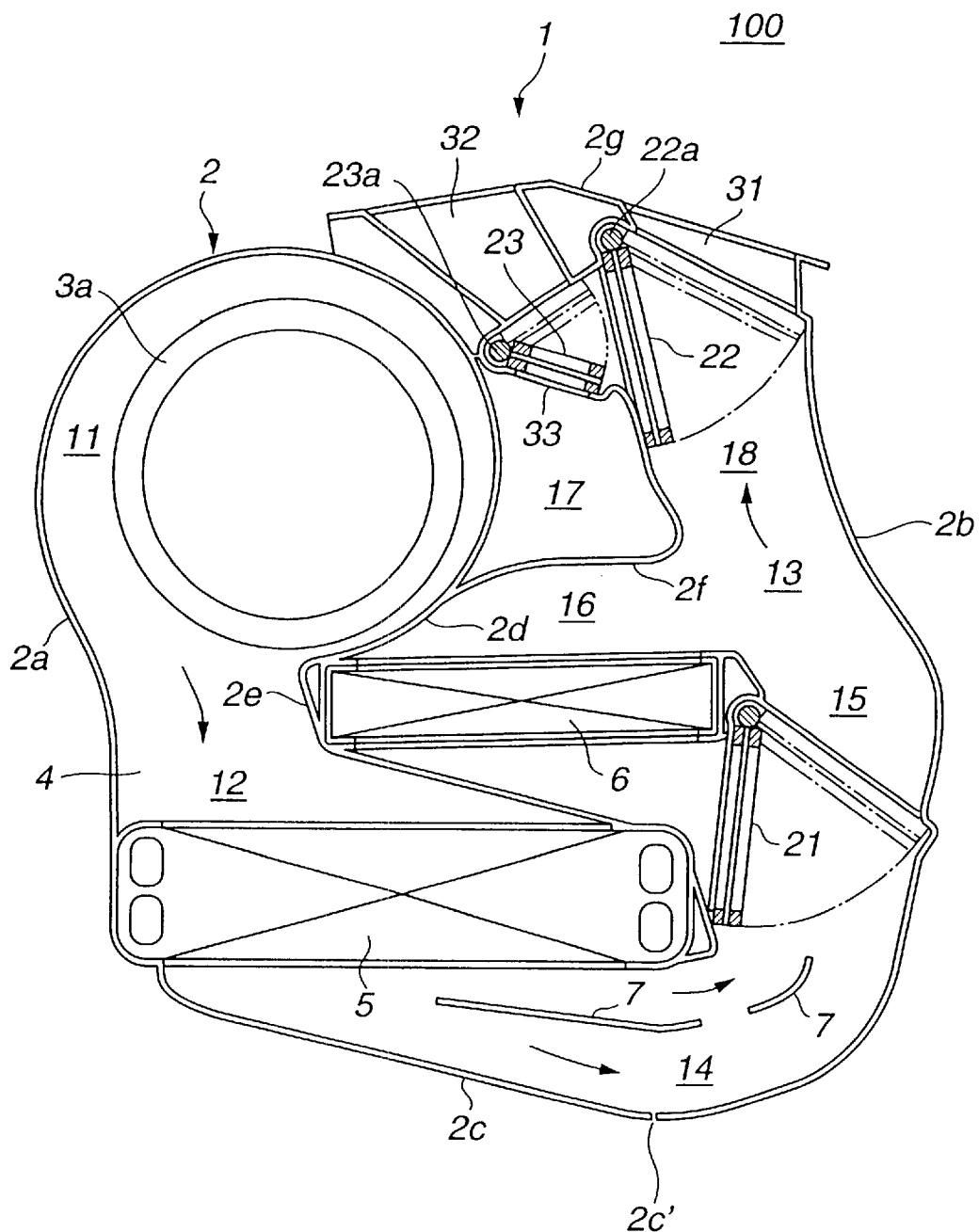
FIG. 2 is a sectional view of the air conditioner unit of the invention.

Referring to FIGS. 1 to 10B, particularly FIGS. 1 and 2, there is shown an air conditioner unit according to the present invention.

As is seen from FIGS. 1 and 2, the air conditioner unit 100A of the invention comprises a case 2 which is to be mounted below an instrument panel of an associated motor vehicle. The case 2 comprises a front wall 2a facing toward an engine room of the vehicle and a rear wall 2b facing toward a passenger room.

As is seen from FIG. 2, within the case 2, there is defined a scroll chamber 11 just behind an upper part of the front wall 2a. That is, in the scroll chamber 11, there is installed a scirocco fan 3a. From the scroll chamber 11, there extends an air passage 4 through which air flow produced by the scirocco fan 3a runs downstream. The air passage 4 comprises a down-passage 12 through which the air flow from the fan 3a goes down along the front wall 2a, an up-passage 13 through which the air flow from the down-passage 12 goes up along the rear wall 2b and a lower-passage 14 by which the down-passage 12 and the up-passage 13 are connected. The lower passage 14 extends along a bottom wall 2c of the case 2, as shown.

As will be described hereinlater, the up-passage 13 comprises a warm air passage 16 in which the heater unit 6 is actually installed, a bypass passage 15 which bypasses the warm air passage 16 and an air mix chamber 18 to which respective downstream ends of the warm air passage 16 and the bypass passage 15 are connected.

In the down-passage 12, there is disposed an evaporator 5 for cooling air flowing therethrough. While, in the up-passage 13, there is disposed heater unit 6 for heating air that has passed through the evaporator 5. As shown, upon assembly, the evaporator 5 is inclined by about 10 to 30 degrees relative to a horizontal line having its front (or left) end positioned lower than its rear (or right) end. The air passing through the evaporator 5 runs through the lower-passage 14 along the bottom wall 2c of the case 2.

As shown in FIG. 2, in the lower-passage 14, there are arranged air guide plates 7 for smoothly guiding the air flow toward the up-passage 13. As shown, the bottom wall 2c of the case 2 comprises inclined parts which constitute a lowermost portion with a drain opening 2c'. That is, any water condensed on the outer surface of the evaporator 5 flows down along the inclined parts of the bottom wall toward the lowermost portion and discharges into the outside through the drain opening 2c'.

In the case 2, there is formed an internal wall 2d by which the scroll chamber 11 and the up-passage 12 are separated from each other. The inner wall 2d has, at a position between the scroll chamber 11 and the down-passage 12, a depressed part 2e that is depressed toward the down-passage 12. As shown, the heater unit 6 has a left end neatly received in the depressed part 2e and is arranged generally in parallel with the evaporator 5 in the down-passage 12.

The up-passage 13 comprises the bypass passage 15 which extends along the rear wall 2b of the case 2 bypassing the heater unit 6. The up-passage further comprises the warm air passage 16 in which the heater unit 6 is actually installed. At an upstream section of the up-passage 13, there is pivotally installed an air mix door 21 which adjusts an air flow rate between the bypass passage 15 and the warm air passage 16. That is, the air mix door 21 pivots between a terminal position to close the bypass passage 15, an intermediate position to partially open both the bypass passage 15 and the warm air passage 16 and another terminal position to close the warm air passage 16.

In the case 2, there is further formed another internal wall 2f which extends around the zone of the scroll chamber 11 to define therebetween a foot air passage 17. That is, the foot air passage 17 and the up-passage 13 are separated from each other by the internal wall 2f. A downstream end of the bypass passage 15 and that of the warm air passage 16 are mated to constitute the air mix chamber 18.

A top wall 2g of the case 2 is formed with a ventilation air blow opening 31 and a defroster air blow opening 32 from which conditioned air in the air mix chamber 18 is blown outward to respective given outside portions. As shown, the ventilation air blow opening 31 is positioned near an upper portion of the rear wall 2b of the case 2, and the defroster air blow opening 32 is positioned near an upper portion of the front wall 2a of the case 2. An upper part of the inner wall 2f which faces the defroster air blow opening 32 is formed with a foot air connecting opening 33 through which the up-passage 13 and the foot air passage 17 are connected.

As is understood from FIG. 1, each side wall 2h of the case 2 is formed with a foot air blowing opening 34 which forms an end of the foot air passage 17. In operation, air flowing in the foot air passage 17 is blown into a lower portion of the vehicle cabin from the foot air blowing opening 34.

Referring back to FIG. 2, at the ventilation air blow opening 31, there is arranged a first mode door 22 which adjusts air flow toward the ventilation air blow opening 31. The first mode door 22 pivots together with a pivot shaft 22a pivotally connected to the case 2 between an open position to close the up-passage 13 directed to the defroster air blow opening 32 and the foot air blowing opening 33 and open the ventilation air blow opening 31 and a close position to open the up-passage 13 and close the ventilation air blow opening 31.

At a branched portion between the defroster air blowing opening 32 and the foot air blowing opening 33, there is arranged a second mode door 23 which adjusts both air flow toward the defroster air blowing opening 32 and air flow toward the foot air blowing opening 33. The second mode door 23 pivots together with a pivot shaft 23a pivotally connected to the case 2 between a defroster air position to open the defroster air blow opening 32 and close the foot air blow opening 33 and a foot air position to close the defroster air blow opening 32 and open the foot air blow opening 33.

Referring back to FIG. 1, on one of the side walls 2h of the case 2, there is arranged a mode door actuating mechanism 8 which actuates the first and second mode doors 22 and 23 in given manners. That is, as will become apparent as the description proceeds, upon need of a certain operation mode of the air conditioner unit 100A, the first and second mode doors 22 and 23 are pivoted to desired positions by the mode door actuating mechanism 8.

Figure 3:
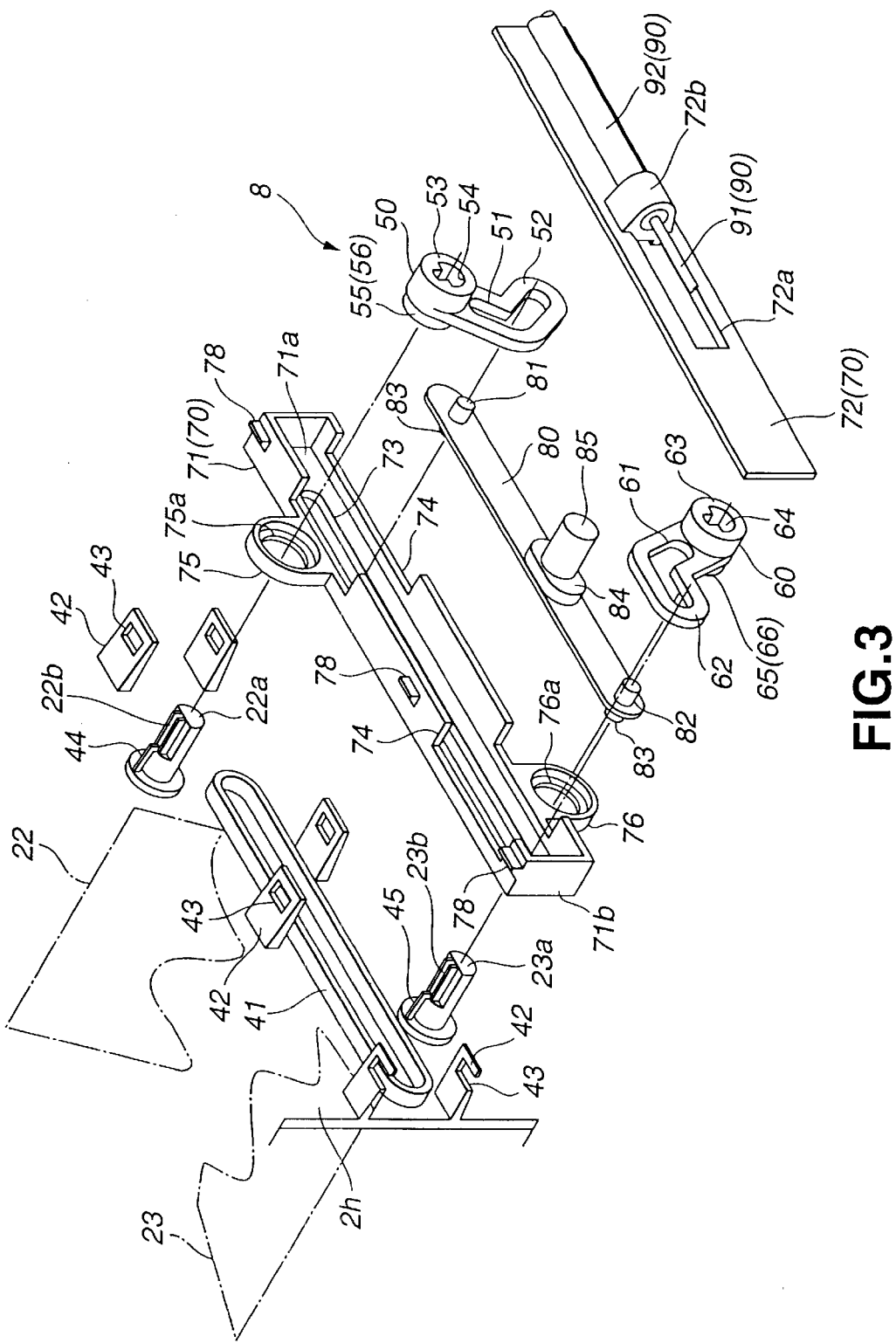
FIG. 3 is an exploded view of a mode door actuating mechanism which constitutes an essential portion of the air conditioner unit of the invention.

Referring to FIGS. 1 and 3, there is shown the detail of the mode door actuating mechanism 8 in an exploded manner.

The mode door actuating mechanism 8 comprises a housing 70 which is mounted to the side wall 2h of the case 2 and a slider member 80 which is slidably received in the housing 70. The mode door actuating mechanism 8 further comprises a first operation lever 50 which is fixed to the pivot shaft 22a of the first mode door 22 and formed with a L-shaped cam opening 51 and a second operation lever 60 which is fixed to the pivot shaft 23a of the second mode door 23 and formed with a L-shaped cam opening 61. These L-shaped cam openings 51 and 61 are applied with a suitable amount of grease.

As is seen from FIG. 3, the slider member 80 has at its right end a first engaging pin 81 slidably engaged with the L-shaped cam opening 51 of the first operation lever 50 and at its left end a second engaging pin 82 slidably engaged with the L-shaped cam opening 61 of the second operation lever 60. Due to presence of grease, the sliding movement of the pin 81 or 82 along the corresponding opening 51 or 61 is smoothly made.

The mode door actuating mechanism 8 further comprises an actuating means 90 which can slide the slider member 80 to a desired position shifting the first and second engaging pins 81 and 82 to their desired positions. The actuating means 90 comprises a flexible wire 91 and a flexible guide tube 92 through which the flexible wire 91 slidably moves. One end of the flexible wire 91 is connected to a control knob of a controller (not shown). The other end of the flexible wire 91 is connected to a stud member 85 formed on the slider member 80. Thus, upon manipulation of the control knob of the controller, the flexible wire is slid in the guide tube 92 thereby to slide the slider member 80 to a desired position.

The engagement between the L-shaped cam opening 51 of the first operation lever 50 and the first engaging pin 81 is so made that, under a certain mode of the air conditioning unit 100, the first operation lever 50 is turned to a position to cause the first mode door 22 to take a certain angular position. The engagement between the L-shaped cam opening 61 and the second engaging pin 82 is so made that, under a certain mode of the air conditioning unit 100, the second operation lever 60 is turned to a position to cause the second mode door 23 to take a certain angular position.

As shown, the first operation lever 50 comprises a lever portion 52 with the cam opening 51 and a cylindrical hub portion 53 coaxially fixed to the pivot shaft 22a of the first mode door 22. That is, the cylindrical hub portion 53 is formed with a non-circular bore 54 into which a non-circular terminal end of the pivot shaft 22a is inserted to achieve a united rotation therebetween.

The second operation lever 60 comprises a lever portion 62 with the cam opening 61 and a cylindrical hub portion 63 coaxially fixed to the pivot shaft 23a of the second mode door 23. That is, the cylindrical hub portion 63 is formed with a non-circular bore 64 into which a non-circular terminal end of the pivot shaft 23a is inserted to achieve a united rotation therebetween.

The housing 70 comprises an elongate housing proper 71 which is shaped to receive therein the slider member 80, and an elongate lid member 72 which is attached to the housing proper 71. The housing proper 71 comprises an elongate bottom wall 71a having a longitudinally extending slot 73, two elongate side walls raised from side ends of the bottom wall 71a and two end walls 71b raised from longitudinal ends of the bottom wall 71a. The slider member 80 has projections 83 slidably engaged with the elongate slot 73 of the bottom wall 71a of the housing proper 71, so that the movement of the slider member 80 in the housing proper 71 is guided by the projections 83 and the slot 73.

The lid member 72 of the housing 70 has a rear surface to which tops of the first and second engaging pins 81 and 82 slidably contact. Due to provision of the lid member 72 attached to the housing proper 71, the first and second operation levers 50 and 60 are suppressed from dismantling from the respective engaging pins 81 and 82.

The two elongate side walls of the housing proper 71 are formed with two cuts 74 respectively from which the first and second operation levers 50 and 60 are freely projected outward. The upper side wall of the housing proper 71 has at its right part a first holding portion 75 which is formed with a circular opening 75a to rotatably support an annular portion 55 of the first operation lever 50. While, the lower side wall of the housing proper 71 has at its left part a second holding portion 76 which is formed with a circular opening 76a to rotatably support an annular portion 65 of the second operation lever 60.

As is seen from FIG. 3, the side wall 2h of the case 2 is formed with an oval rib 41 for positioning the housing proper 71 and six resilient holding pieces 42 for holding the housing proper 71. Each holding piece 42 is formed with a catching hole 43.

Although not shown in FIG. 3, the bottom wall 71a of the housing proper 71 is formed at its rear surface with an oval projection which is snugly mated with the oval rib 41 of the side wall 2h of the case 2 thereby to achieve the positioning of the housing proper 71 relative to the case 2. Furthermore, the upper and lower side walls of the housing proper 71 are formed with projections 78 which are mated with the catching holes 43 of the above-mentioned holding pieces 42 in a snap action manner. As shown, each projection 78 is in the shape of wedge for assuring the snap action connection of the housing proper 71 relative to the case 2.

As shown, the slider member 80 is formed at its generally middle part with an oval projection 84 from which the stud member 85 projects. The elongate lid member 72 of the housing proper 71 is formed with an elongate slot 72a with which the stud member 85 is slidably engaged. As has been described hereinabove, the flexible wire 91 is connected to the stud member 85. The lid member 72 is formed with a clamp portion 72b by which the guide tube 92 for the flexible wire 91 is clamped.

The housing 70, the slider member 80, the first and second operation levers 50 and 60 are assembled in the above-mentioned manner to constitute a unit. The unit is mounted to the side wall 2h of the case 2 in the above-mentioned manner. In the unit, the slider member 80 is slidably installed in the housing 70, and the first operation lever 50 is rotatably held by the first holding portion 75 having the first engaging pin 81 of the slider member 80 slidably engaged with the L-shaped cam opening 51 of the first operation lever 50. Furthermore, in the unit, the second operation lever 60 is rotatably held by the second holding portion 76 having the second engaging pin 82 of the slider member 80 slidably engaged with the L-shaped cam opening 61 of the second operation lever 60.

Figure 4:
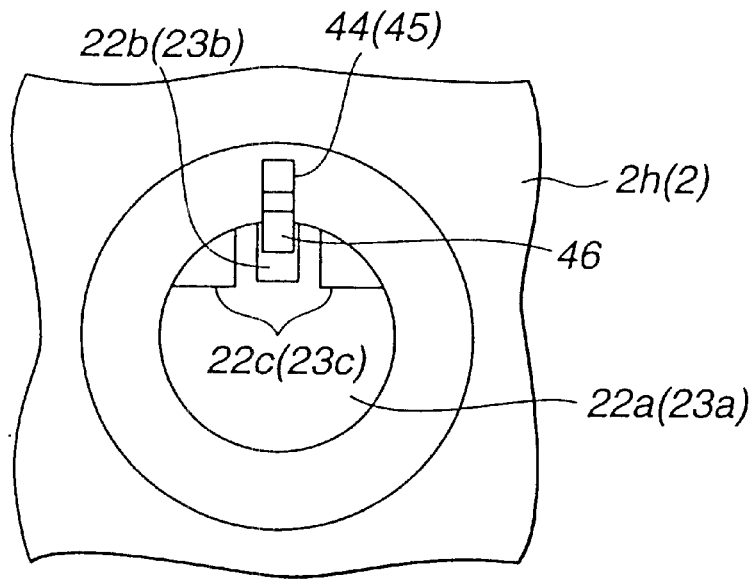
FIG. 4 is an enlarged front view showing a rotation shaft of a mode door.
Figure 5:
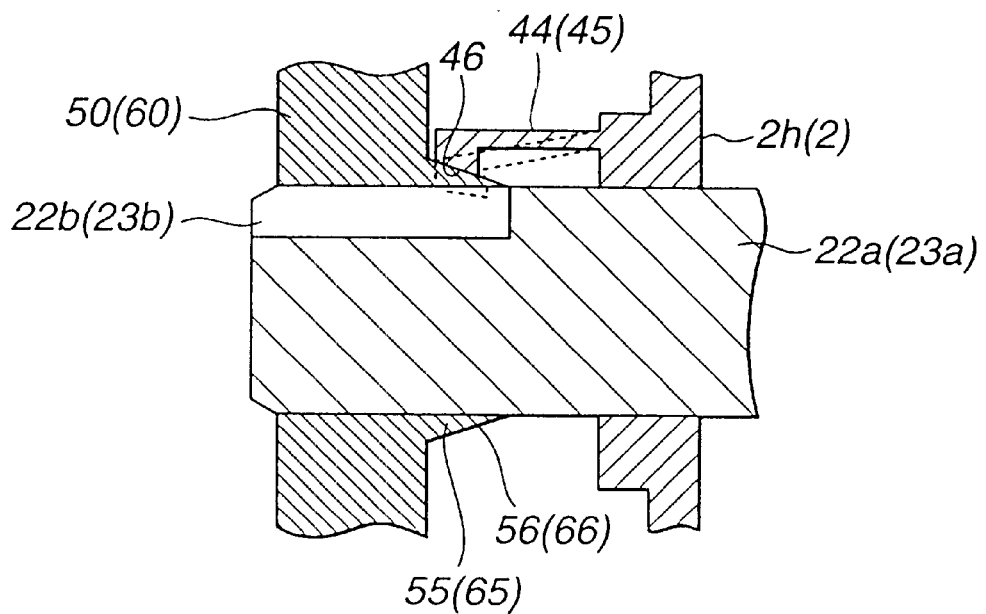
FIG. 5 is an enlarged sectional view showing but partially an operation lever that is about to be engaged with the rotation shaft.

Referring to FIGS. 4 and 5, there is shown the detail of the connection between the first operation lever 50 (or second operation lever 60) and the pivot shaft 22a of the first mode door 22 (or the pivot shaft 23a of the second mode door 23). That is, FIG. 4 is an enlarged end view of the pivot shaft 22a (or 23a), and FIG. 5 is an axially sectional view of the end of the pivot shaft 22a (or 23a) mated with the operation lever 50 (or 60).

As is seen from FIGS. 3, 4 and 5, the pivot shafts 22a and 23a of the first and second operation levers 50 and 60 have each an axially extending groove 22b or 23b. As is best seen from FIGS. 3 and 5, two resilient arms 44 and 45 are projected from the side wall 2f of the case 2, each having a latching pawl having a sloped lower surface 46 as is seen from FIG. 5. As is seen from FIG. 3, before complete assembly of the mode door actuating mechanism 8, the latching pawls of the resilient arms 44 and 45 are kept engaged with the grooves 22b and 23b respectively for keeping the corresponding mode doors 22 and 23 at their given angular positions.

As is seen from FIG. 5, the annular portion 55 or 65 of the first or second operation lever 50 or 60 is formed with a conical outer surface 56 or 66. As is seen from this drawing, the conical outer surface 56 or 66 is constructed and shaped to incorporate with the sloped lower surface 46 of the latching pawl of the resilient arm 44 or 45 of the side wall 2h of the case 2.

It is to be noted that the conical outer surface 56 or 66 serves as a canceling means for canceling the latched engagement between the latching pawl of the resilient arm 44 or 45 and the groove 22b or 23b. That is, as is seen from FIG. 5, when the first or second operation lever 50 or 60 is thrust onto and about to be engaged the corresponding pivot shaft 22a or 23a of the first or second mode door 22 or 23, the conical outer surface 56 or 66 gets under the latching pawl of the resilient arm 44 or 45 and thus raises the same thereby to cancel the latched engagement between the latching pawl of the resilient arm 44 or 45 and the groove 22b or 23b. With this, the first or second operation lever 50 or 60 becomes united with the pivot shaft 22a or 23a of the first or second mode door 22 or 23 to pivot together therewith.

As is seen from FIG. 4, the end of the pivot shaft 22a or 23a of the first or second mode door 22 or 23 is formed with spaced cuts 22c or 23c between which the groove 22b or 23b is defined with interposition of walls (no numerals) therebetween. These cuts 22c and 23c serve as positioning means for positioning the first or second operation lever 50 or 60 relative to the first or second mode door 22 or 23.

Figure 6A:
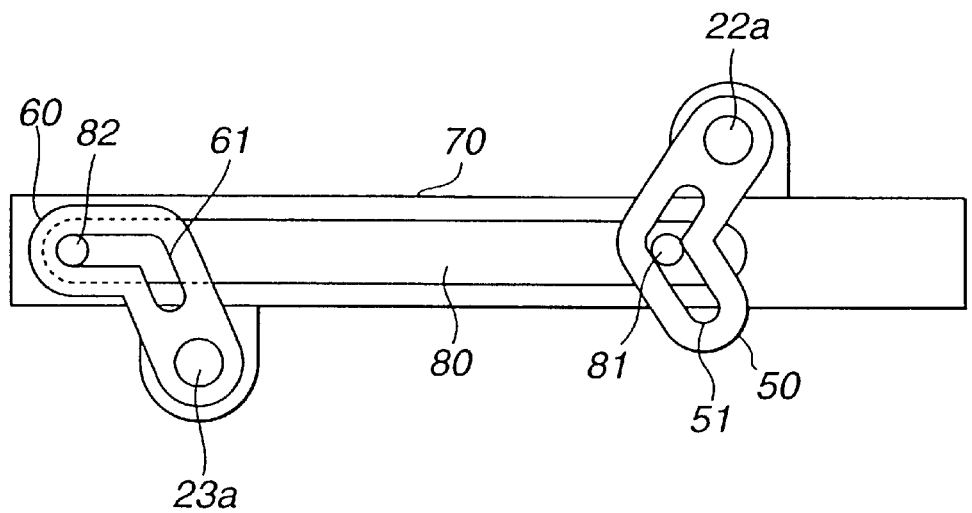
FIGS. 6A and 6B are views showing the operation condition of two operation levers and two mode doors under ventilation mode of the air conditioner unit of the invention.
Figure 6B:
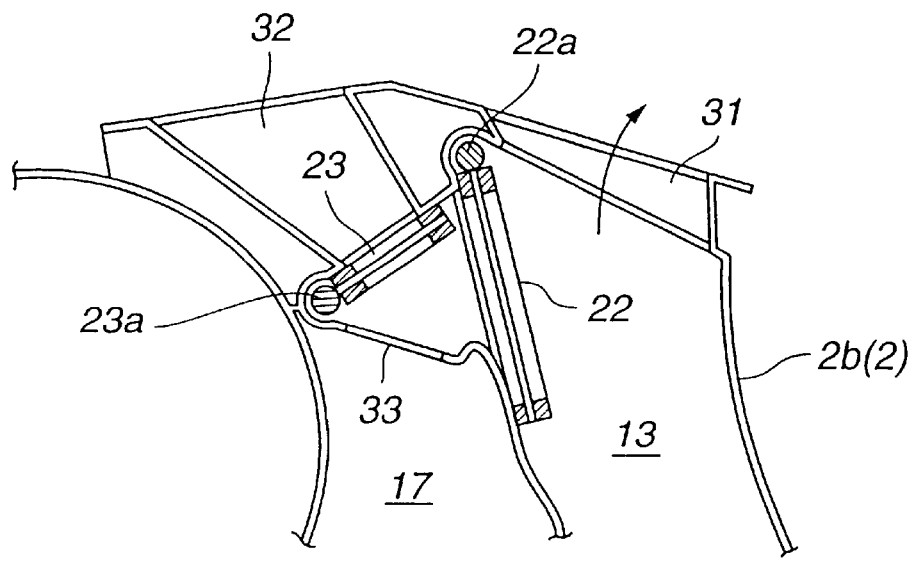

In FIGS. 6A and 6B, there is shown an operation condition of the operation levers 50 and 60 and mode doors 22 and 23 under VENTILATION mode. As is seen from FIG. 6A, under this mode, the first engaging pin 81 of the slider member 80 is at the inflection part of the L-shaped cam opening 51 of the first operation lever 50, and the second engaging pin 82 is at a left end of the upper part of the L-shaped cam opening 61 of the second operation lever 60. As shown, in this mode, the upper part of the L-shaped cam opening 61 is arranged in parallel with the slider member 80. As is seen from FIG. 6B, under the VENTILATION mode, the first mode door 22 takes an open position, that is a position to close the passage directed from the up-passage 13 toward both the defroster air blow opening 32 and the foot air blow opening 33 and open the ventilation air blow opening 31, and the second mode door 23 takes a foot air position closing the defroster air blow opening 32 while opening the foot air blow opening 33. Thus, under this VENTILATION mode, conditioned air flowing in the up-passage 13 is blown into the vehicle cabin through only the ventilation air blow opening 31 as is indicated by the arrow.

Figure 7A:
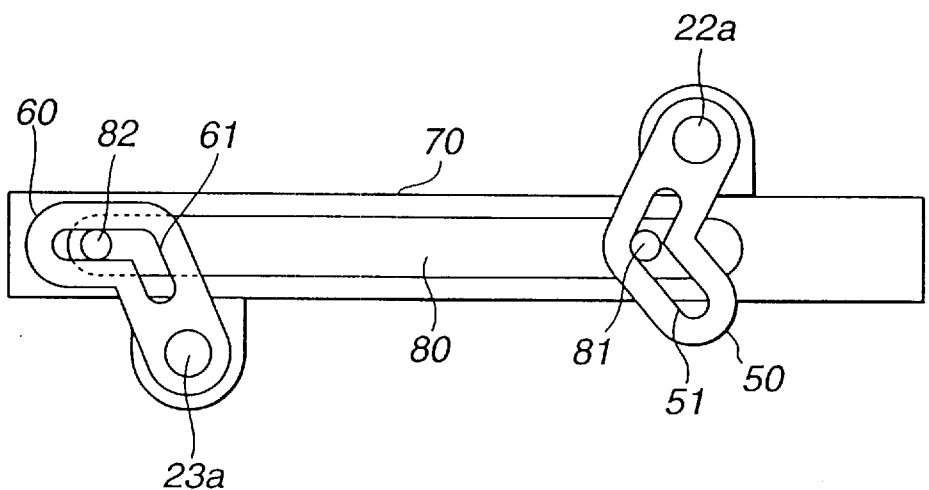
FIGS. 7A and 7B are views similar to FIGS. 6A and 6B, but showing the operation condition of the operation levers and mode doors under bi-level mode of the air conditioner unit.
Figure 7B:
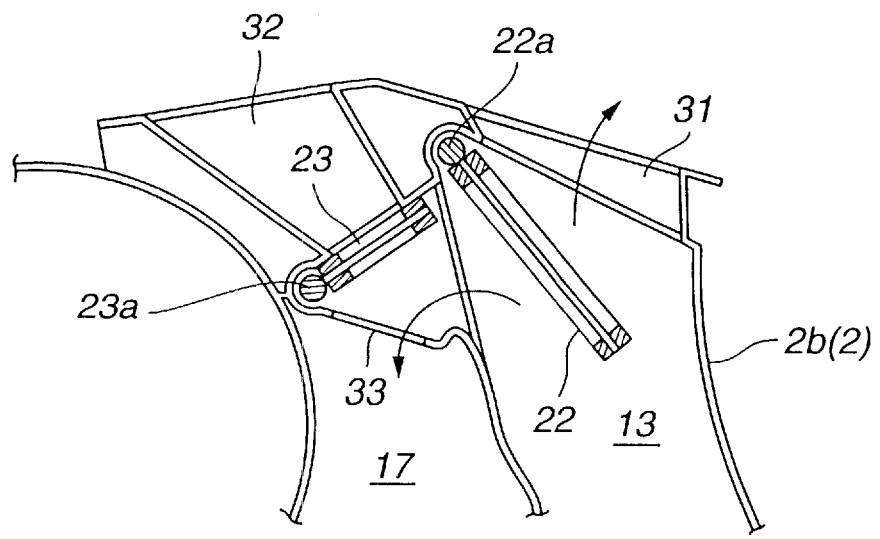

In FIGS. 7A and 72B, there is shown the operation condition under BI-LEVEL mode. As is seen from FIG. 7A, for achieving this mode, the slider member 80 is somewhat shifted rightward in the drawing as compared with the case of the above-mentioned VENTILATION mode. Accordingly, the first operation lever 50 is pushed rightward by the first engaging pin 81 and thus pivoted slightly in a counterclockwise direction, while the second operation lever 60 is left unmoved because of inoperative movement of the second engaging pin 82 in the upper horizontal part of the L-shaped cam opening 61 of the second operation is lever 60. Accordingly, as is seen from FIG. 7B, under the BI-LEVEL mode, the first mode door 22 takes a half-open position partially opening the passage directed toward the foot air blow opening 33 and the ventilation air blow opening 31. Of course, the second mode door 23 is kept in the foot air position. Thus, under this BI-LEVEL mode, conditioned air flowing in the up-passage 13 is blown into the vehicle cabin from both the ventilation air blow opening 31 and the foot air blow opening 33 as is indicated by the arrows.

Figure 8A:
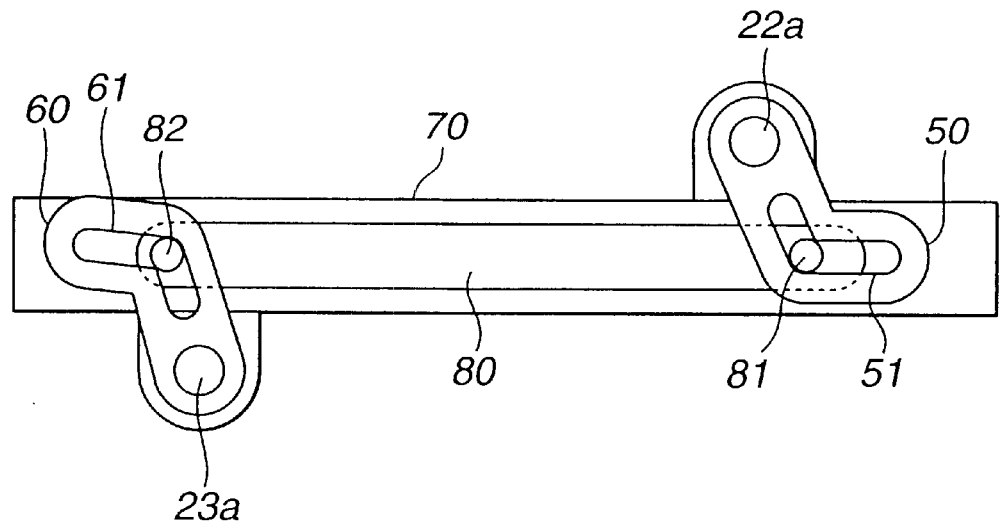
FIGS. 8A and 8B are views similar to FIGS. 6A and 6B, but showing the operation condition of the operation levers and mode doors under heat mode of the air conditioner unit.
Figure 8B:
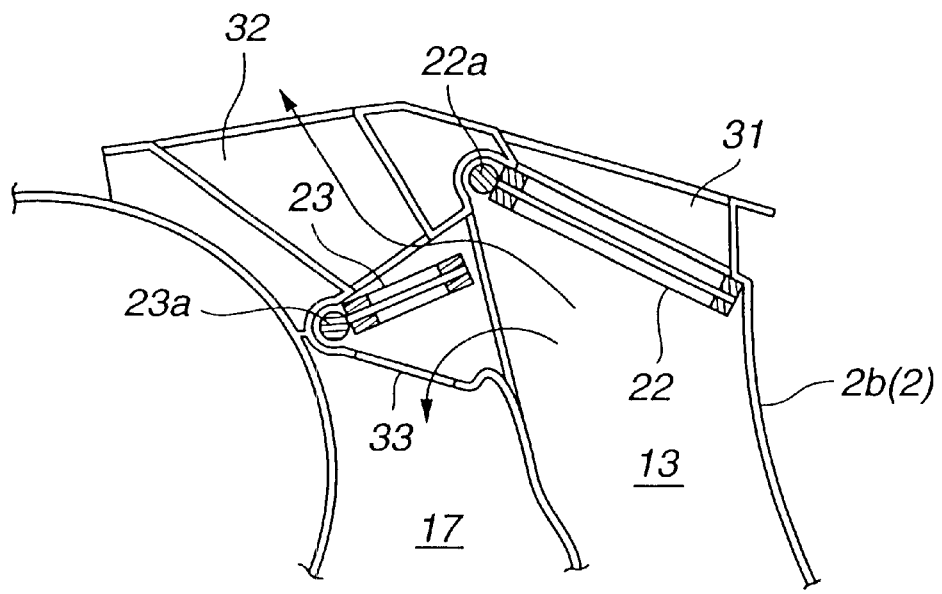

In FIGS. 8A and 8B, there is shown the operation condition under HEAT mode. As is seen from FIG. 8A, for achieving this mode, the slider member 80 is further shifted rightward in the drawing. Accordingly, the first operation lever 50 is further pushed rightward by the first engaging pin 81 and thus further pivoted counterclockwise. As shown, upon achieving this mode, the lower part of the L-shaped cam opening 51 of the lever 50 becomes in parallel with the slider member 80. For achieving this HEAT mode, the second operation lever 60 is pushed rightly by the second engaging pin 82 and thus pivoted slightly in a clockwise direction in the drawing. Upon achieving this mode, the second engaging pin 82 comes to the inflection part of the L-shaped cam opening 61 of the second operation lever 60, as shown. Accordingly, as is seen from FIG. 8B, under the HEAT mode, the first mode door 22 takes a close position closing the ventilation air blow opening 31 while opening the passage directed toward both the defroster air blow opening 32 and foot air blow opening 33, and the second mode door 23 takes a first half-open position partially opening both the defroster air blow opening 32 and the foot air blow opening 33. As shown, in the first half-open position of the second mode door 23, the open degree of the foot air blow opening 33 is larger than that of the defroster air blow opening 32. Under this HEAT mode, conditioned air flowing in the up-passage 13 is blown into the vehicle cabin from both the defroster air blow opening 32 and the foot air blow opening 33, as is indicated by the arrows. Of course, the amount of air from the foot air blow opening 33 is larger than that from the defroster air blow opening 32.

Figure 9A:
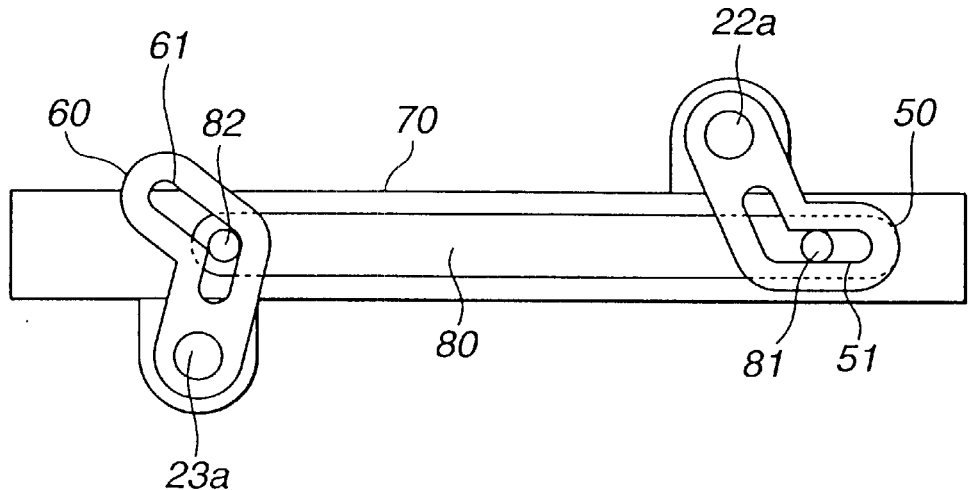
FIGS. 9A and 9B are views similar to FIGS. 6A and 6B, but showing the operation conditions of the operation levers and mode doors under defroster-foot mode of the air conditioner unit.
Figure 9B:
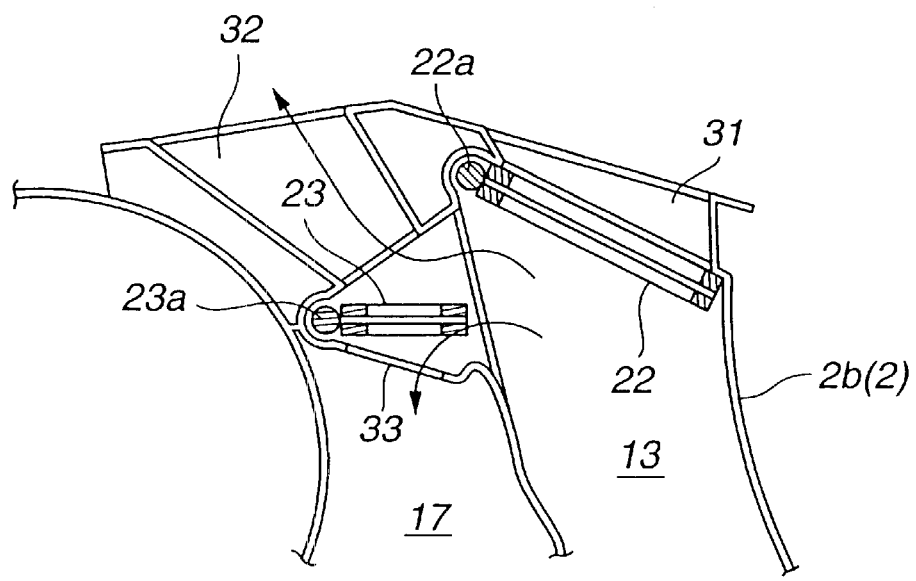

In FIGS. 9A and 9B, there is shown the operation condition under DEFROSTER-FOOT mode. As is seen from FIG. 9A, for achieving this mode, the slider member 80 is further shifted rightward in the drawing. During this shifting, the first engaging pin 81 slides without effect in the lower part of the L-shaped cam opening 51 of the first operation lever 50, and thus the first operation lever 50 is kept unmoved. However, due to the further rightward shifting of the slider member 80, the second engaging pin 82 pushes the second operation lever 60 rightward and thus the second operation lever 60 is further pivoted clockwise. Accordingly, as is seen from FIG. 9B, under the DEFROSTER-FOOT mode, the first mode door 22 keeps the close position closing the ventilation air blow opening 31 while opening the passage directed toward both the defroster air blow opening 32 and the foot air blow opening 33, and the second mode door 23 takes a second half-open position partially opening both the defroster air blow opening 32 and the foot air blow opening 33. As shown, in the second half-open position of the second mode door 23, the open degree of the defroster air blow opening 32 is larger than that of the foot air blow opening 33. Thus, under this DEFROSTER-FOOT mode, a larger amount of conditioned air is blown into the vehicle cabin from the defroster air blow opening 32, and a smaller amount of conditioned air is blown into the vehicle cabin from the foot air blow opening 33.

Figure 10A:
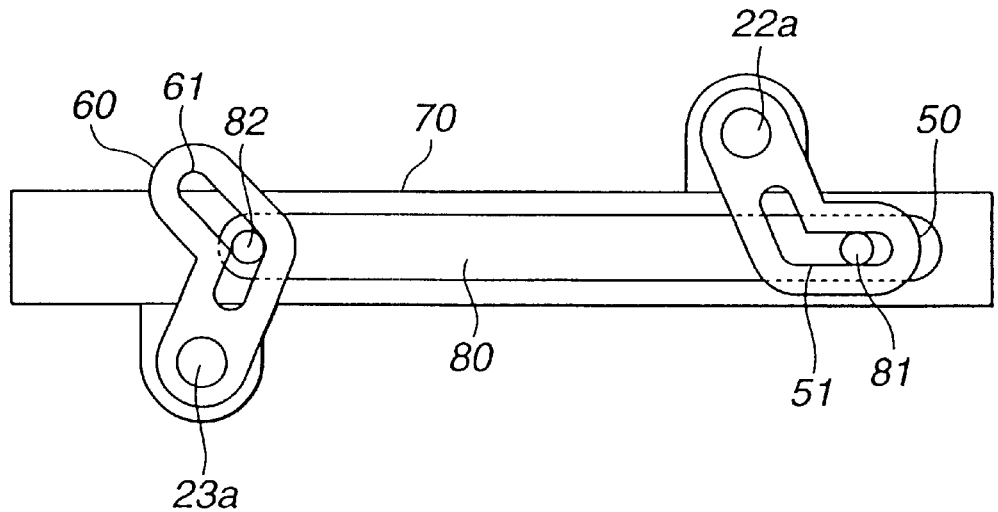
FIGS. 10A and 10B are views similar to FIGS. 6A and 6B, but showing the operation condition of the operation levers and mode doors under defroster mode of the air conditioner unit.
Figure 10B:
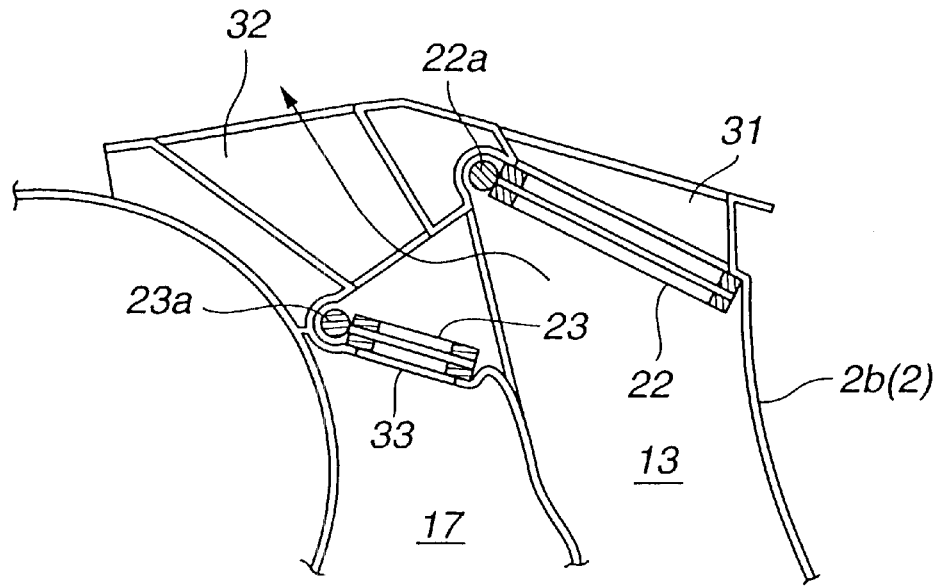

In FIGS. 10A and 10B, there is shown the operation condition under DEFROSTER mode. As is seen from FIG. 10A, for achieving this mode, the slider member 80 is further shifted rightward in the drawing. During this shifting, the first engaging pin 81 still slides without effect in the lower part of the of the L-shaped cam opening 51 of the first operation lever 50, and thus the first operation lever 50 is kept unmoved. However, due to the further rightward movement of the slider member 80, the second engaging pin 82 further pushes the second operation lever 60 rightward and thus the second operation lever 60 is pivoted further in a clockwise direction in the drawing. Accordingly, as is seen from FIG. 10B, under the DEFROSTER mode, the first mode door 22 keeps the close position closing the ventilation air blow opening 31 while opening the passage directed toward both the defroster air blow opening 32 and the foot air blow opening 33, and the second mode door 23 takes a defroster air position opening the defroster air blow opening 32 while closing the foot air blow opening 33. Thus, under this DEFROSTER mode, conditioned air flowing in the up-passage 13 is blown into the vehicle cabin from only the defroster air blow opening 32 as is indicated by the arrow.

As is understood from the above description, when the slider member 80 (see FIG. 3) is pulled or pushed by the flexible wire 91 upon manipulation of the control knob of the controller (not shown) by a driver or passenger, the first and second mode doors 22 and 23 are pivoted to their given angular positions for achieving a desired mode of the air conditioning unit 100.

In following, various advantages of the present invention will be described with the aid of the drawings.

Figure 12:
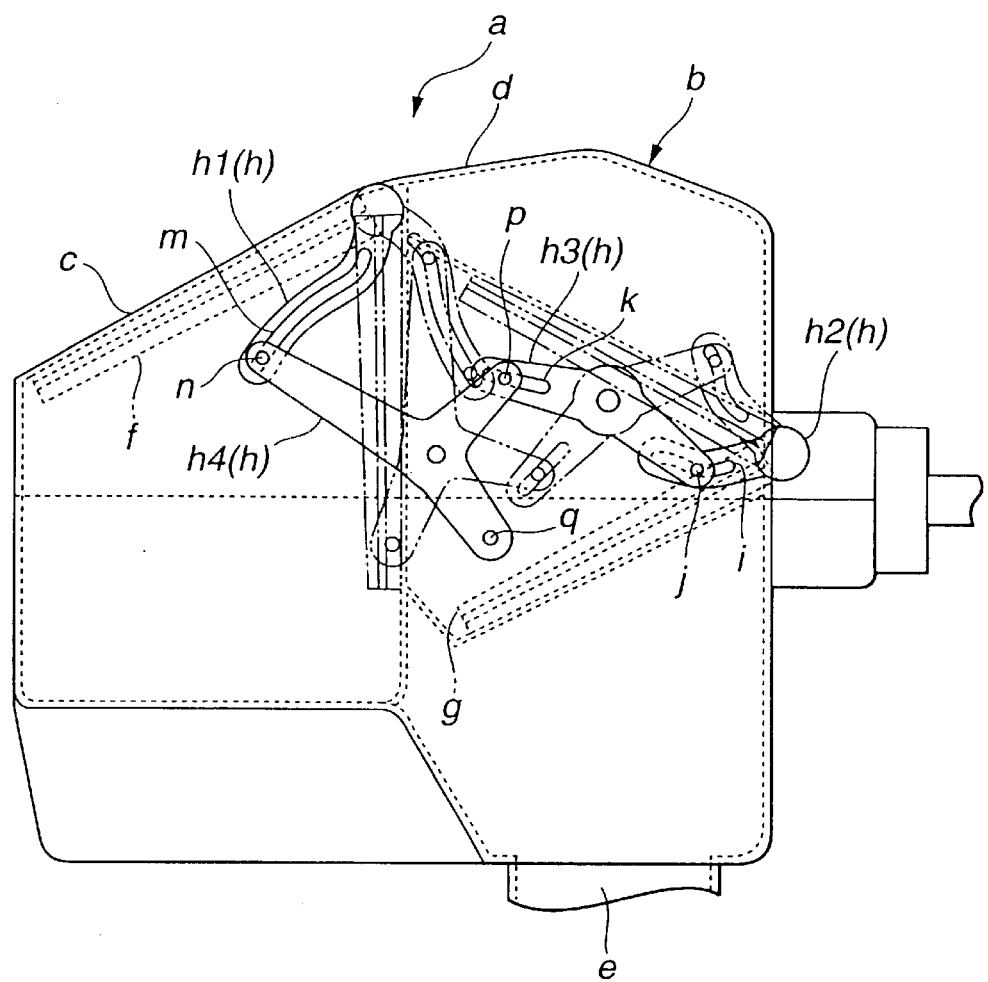
FIG. 12 is a side view of a known air conditioner unit.

First, the pivot shafts 22a and 23a of the first and second mode doors 22 and 23 are arranged at opposite sides with respect to the slider member 80. Due to this arrangement, the sliding movement of the slider member 80 induces pivoting of the first and second mode doors 22 and 23 in opposite directions about their pivot shafts 22a and 23a. That is, the above-mentioned five air distribution modes, that is, VENTILATION, BI-LEVEL, HEAT, DEFROSTER-FOOT and DEFROSTER modes, can be readily provided by a compact construction which includes the first and second mode doors 22 and 23. Furthermore, the mode door actuating mechanism 8 for actuating the two mode doors 22 and 23 is made compact in size. In other words, in the present invention, there is no need of using bulky members such as the rotatable main link "h4" and intermediate link "h3" used in the known air conditioner unit of FIG. 12. Thus, the air distribution unit including the two mode doors 22 and 23 and the mode door actuating mechanism 8 can be made compact, and thus, the entire construction of the air conditioner unit 100 can be made compact in size.

Second, as is described hereinabove, the mode door actuating mechanism 8 can be assembled as a unit. Thus, mounting the mechanism 8 to the case 2 is easily and speedily carried out which brings about reduction in cost of the air conditioner unit 100.

Third, due to provision of the positioning rib 41 and holding pieces 42 by the case 2, the mounting of the mode door actuating mechanism 8 to the case 2 is further facilitated.

Fourth, the air conditioner unit 100 is arranged so that the rear wall 2b (see FIG. 1) thereof is positioned near a front panel of an instrument panel on which the control knob of the controller is mounted. In the invention, the clamp portion 72b (see FIG. 1) is positioned on the side panel, which facilitates the arrangement of the flexible wire 91 extending between the control knob and the clamp portion 72b. Furthermore, such positioning provides the flexible wire 91 with a suitable length smoothly transmitting the operation force of the control knob to the slider member 80. This advantage will be clarified from the following supplementary explanation. That is, if the clamp portion 72b (see FIG. 3) is provided on the rear wall 2b, the distance between the clamp portion 72b and the control knob becomes very short, which makes arrangement of the wiring (91) therebetween very difficult. Furthermore, in assembly, due to the short distance, the flexible wire 91 is curved with a small radius of curvature, which causes a larger operation force needed by the control knob for moving the wire 91. While, if the clamp portion 72b is provided on or near the front wall 2a of the case 2, the flexible wire 91 and the guide tube 92 need longer length which causes increase in cost of the air conditioner unit 100.

Fifth, due to provision of the resilient arms 44 and 45 of the case 2 which are engageable with the grooves 22b and 23b (see FIG. 3) of the pivot shafts 22a and 23a to achieve a latched engagement therebetween, the first and second mode doors 22 and 23 can be fixed to the case 2. Thus, mounting of the mode door actuating mechanism 8 to the side wall 2h of the case 2 is readily achieved. More specifically, mounting of the first and second operation lever 50 and 60 to the pivot shafts 22a and 23a of the doors 22 and 23 is readily carried out.

Sixth, due to provision of the conical annular portions 55 and 65 by the first and second operation levers 50 and 60, thrusting the hub portions 53 and 63 of these levers 50 and 60 onto the ends of the pivot shafts 22a and 23a automatically cancels the latched engagement between the resilient arms 44 and 45 and the grooves 22b and 23b. This facilitates the mounting of the levers 50 and 60 to the pivot shafts 22a and 23a.

Seventh, due to provision of the spaced cuts 22c and 23c by the pivot shafts 22a and 23a, positioning of the first and second operation levers 50 and 60 relative to the first and second mode doors 22 and 23 is established upon coupling of the hub portions 53 and 63 with the pivot shafts 22a and 23a.

Figure 11:
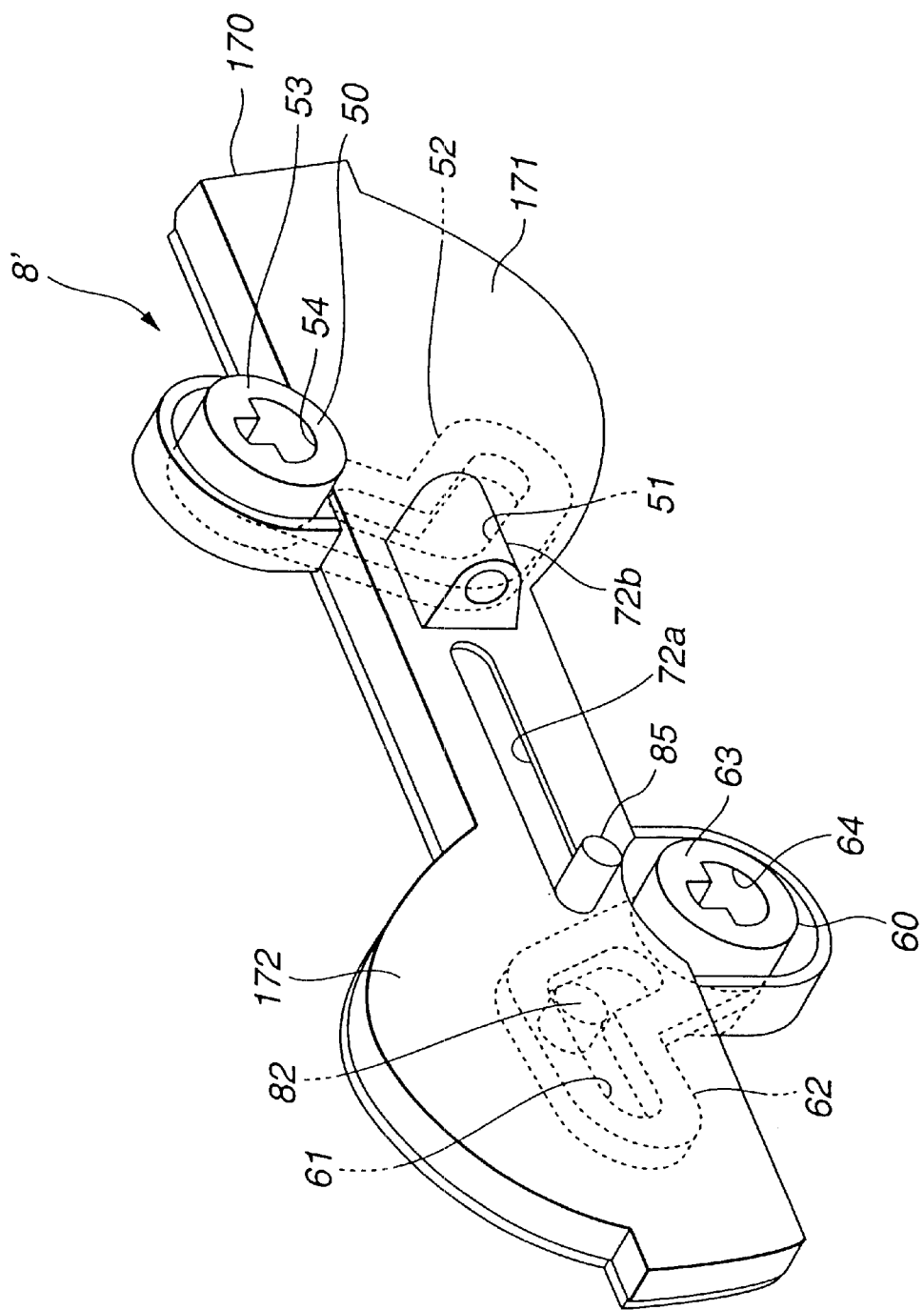
FIG. 11 is a perspective of a modification of the mode door actuating mechanism, which can be employed in the air conditioner unit of the present invention.

Referring to FIG. 11, there is shown a modification 8' of the above-mentioned mode door actuating mechanism 8.

In this modification, both the first and second operation levers 50 and 60 are entirely concealed in the housing, as will become apparent from the following description.

As is seen from FIG. 11, the modified mechanism 8' comprises a housing 170 which is to be mounted to the side wall 2h of the case 2 in the above-mentioned manner. As shown, the housing 170 is formed with both first and second expanded portions 171 and 172 for spacedly receiving therein the lever portions 52 and 62 of the first and second operation levers 50 and 60 respectively. A suitable amount of grease is applied to the L-shaped cam openings 51 and 61 for smoothing the movement of the first and second engaging pins 81 and 82 in and along the openings 51 and 61.

In this modification, the work for mounting the mechanism 8' to the side wall 2h of the case 2 is readily and much safely achieved because the lever portions 52 and 62 applied with grease are entirely installed in the housing 170.

In the foregoing description, the mode door actuating mechanism 8 or 8' is described to have the housing 70 or 170. However, if desired, such housing 70 or 170 may be integrally formed on the side wall 2h of the case 2.

The entire contents of Japanese Patent Application 2000-225887 (filed Jul. 26, 2000) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An air conditioner unit comprising:

a casing having a plurality of air passages defined therein;

pivotal mode doors pivotally arranged in said case to provide given operation modes of the air conditioner unit when assuming given angular positions, each mode door having a pivot shaft of which leading end is exposed to the outside of a wall of said case; and a mode door actuating mechanism arranged on the wall of said case to actuate said pivotal mode doors, said mode door actuating mechanism comprising:

operation levers which are pivotal relative to the wall of said case, each operation lever having a cam opening and being connected to the exposed leading end the pivot shaft of the corresponding mode door to pivot therewith;

a slider member which is slidable relative to the wall of said case;

engaging pins provided on said slider member and slidably engaged with the cam openings of said operation levers respectively; and an actuator member for sliding said slider member relative to the wall of said case.

2. An air conditioner unit as claimed in claim 1, further comprising a base structure adapted to be mounted to the wall of said case, said base structure having said operation levers pivotally connected thereto and said slider member slidably held thereby.

3. An air conditioner unit as claimed in claim 2, in which each of said operation levers has a hub portion coaxially connected to the leading end of the pivot shaft of the corresponding mode door.

4. An air conditioner unit comprising:

a case having a plurality of air passages defined therein;

at least two pivotal mode doors pivotally arranged in said case to provide various operation modes of the air conditioner unit when assuming given angular positions, each of the mode doors having a pivot shaft of which leading end is exposed to the outside from a wall of said case; and a mode door actuating mechanism attached to an outer surface of said wall of said case to actuate said two pivotal mode doors, said mode door actuating mechanism comprising:

a base structure adapted to be mounted to the outer surface of said wall;

two operation levers pivotally held at respective hub portions thereof by said base structure, each operation lever having a cam opening and being coaxially connected to the leading end of the pivot shaft of corresponding one of said two mode doors;

a slider member slidably held on said base structure;

two engaging pins provided on said slider member and slidably engaged with the cam openings of said two operation levers respectively; and an actuator member for sliding said slider member relative to said base structure.

5. An air conditioner unit as claimed in claim 4, further comprising a latching structure which latches the pivot shaft of at least one of said mode doors relative to said case when the corresponding operation lever is disconnected from said pivot shaft, said latching structure comprising:

a resilient arm provided by said case, said resilient arm having a catching pawl; and a groove formed in the leading end of the pivot shaft and engageable with said catching pawl to establish a latched condition of said pivot shaft relative to the case.

6. An air conditioner unit as claimed in claim 5, further comprising a latch canceling structure which cancels the latched condition of said latching structure when the corresponding operation lever is about to engage with the leading end of said pivot shaft, said latch canceling structure comprising:

an annular portion concentrically connected to the hub portion of the corresponding operation lever, said annular portion having a conical outer surface; and a sloped lower surface possessed by the latching pawl of said resilient arm, so that when the said portion is thrust onto the leading end of said pivot shaft for the engagement of the corresponding operation lever with the pivot shaft, the conical annular portion pushes up said latching pawl from said groove thereby to cancel the latched condition of said shaft relative to the case while establishing a united connection between the corresponding operation lever and the pivot shaft.

7. An air conditioner unit as claimed in claim 6, further comprising a positioning structure which establishes positioning of the operation lever relative to the corresponding pivot shaft when the operation lever is engaged with the corresponding shaft, said positioning structure comprising:

a non-circular opening possessed by the hub portion of the operation lever; and a non-circular leading end provided by said pivot shaft, said non-circular leading end being inserted into said non-circular opening in such a manner as to suppress a relative rotation therebetween.

8. An air conditioner unit as claimed in claim 4 further comprising a mounting structure which detachably mounts said mode door actuating mechanism to the outer surface of said wall of said case, said mounting structure comprising:

a rib provided by said outer surface of said wall;

a projection provided by said base structure, said projection being sized to snugly mate with said rib;

a plurality of holding pieces provided by said outer surface of said wall, each piece having a catching hole; and a plurality of projections provided by said base structure, said projections being engaged with the catching holes of said holding pieces.

9. An air conditioner unit as claimed in claim 4, in which said two operation levers are arranged at opposite positions with respect to said slider member, so that the sliding movement of said slider member induces rotations of said two operation levers in mutually opposite directions.

10. An air conditioner unit as claimed in claim 4, in which said base structure is an elongate housing in which said slider member is slidably held, said housing having an elongate lid member attached thereto.

11. An air conditioner unit as claimed in claim 10, in which said elongate housing is so sized as to entirely install said operation levers therein.

12. An air conditioner unit as claimed in claim 4, in which said actuator member comprises:

a stud member provided on said slider member; and a flexible wire having one end fixed to said stud member and the other end connected to an external controller.

13. An air conditioner unit as claimed in claim 4, in which each of the operation levers of said mode door actuating mechanism comprises:

a hub portion; and a lever portion extending outward from said hub portion and having therein said cam opening, said cam opening being generally L-shaped.

14. An air conditioner unit as claimed in claim 4, in which said mode door actuating mechanism further a slider member guiding structure which comprises:

at least two projections provided by said slider member; and a longitudinally extending slot formed in said base structure, said slot slidably receiving therein said two projections.

15. An air conditioner unit comprising:

a case having a plurality of air passages defined therein;

two pivotal mode doors pivotally arranged in said case to provide various operation modes of the air conditioner unit when assuming given angular positions, each of the mode doors having a pivot shaft of which leading end is exposed to the outside from a wall of said case; and a mode door actuating mechanism detachably attached to an outer surface of said wall of said case to actuate said two pivotal mode doors, said mode door actuating mechanism comprising:

an elongate housing detachably mounted to the outer surface of said wall, said housing having first and second holding portions at upper and lower walls thereof;

first and second operation levers pivotally held at respective hub portions thereby by said first and second holding portions respectively, each operation lever having a generally L-shaped cam opening and being coaxially connected to the leading end of the pivot shaft of corresponding one of said two mode doors;

a slider member slidably held in said housing;

two engaging pins provided by said slider member and slidably engaged with the L-shaped cam openings of the first and second operation levers respectively;

an elongate lid member attached to said housing; and an actuator member for sliding said slider member in said housing.

* * * * *